United States Patent
Olson et al.

(10) Patent No.: US 9,495,337 B2
(45) Date of Patent: Nov. 15, 2016

(54) DYNAMICALLY CREATED LINKS IN REPORTS

(71) Applicant: Microsoft Technology Licensing, LLC, Redmond, WA (US)

(72) Inventors: April Olson, Perham, MN (US); Paul Bramel, Fargo, ND (US); Charleen Kay Gust, Casselton, ND (US); Sateesh Kumar Kodavali, Fargo, ND (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 632 days.

(21) Appl. No.: 13/652,482

(22) Filed: Oct. 16, 2012

(65) Prior Publication Data

US 2014/0108900 A1    Apr. 17, 2014

(51) Int. Cl.
  *G06F 17/22*   (2006.01)
  *H04L 12/26*   (2006.01)
  *G06F 3/0485*  (2013.01)

(52) U.S. Cl.
  CPC ......... *G06F 17/2235* (2013.01); *G06F 3/0485* (2013.01); *G06F 17/2241* (2013.01); *G06F 17/2247* (2013.01); *H04L 43/06* (2013.01)

(58) Field of Classification Search
  CPC .............. G06F 17/2241; G06F 17/2247; G06F 3/0485; G06F 3/04842
  See application file for complete search history.

(56) References Cited

U.S. PATENT DOCUMENTS

| | | | | |
|---|---|---|---|---|
| 5,809,266 A * | 9/1998 | Touma | ............... | G06F 17/30554 707/999.004 |
| 5,978,818 A * | 11/1999 | Lin | ............... | G06F 17/22 707/E17.013 |
| 6,569,205 B1 * | 5/2003 | Poggi | ............... | G06F 3/0482 715/202 |
| 7,009,609 B2 * | 3/2006 | Miyadai | ............... | G06F 17/246 345/440 |
| 7,039,871 B2 * | 5/2006 | Cronk | ............... | G06F 17/30899 707/999.004 |
| 7,139,977 B1 | 11/2006 | Russell | | |
| 7,222,130 B1 * | 5/2007 | Cras | ............... | G06F 17/30398 379/133 |
| 7,567,912 B2 | 7/2009 | Viarengo et al. | | |
| 7,640,496 B1 * | 12/2009 | Chaulk | ............... | G06F 3/067 707/999.102 |
| 7,702,684 B2 * | 4/2010 | Unz | ............... | G06F 17/3089 707/758 |

(Continued)

OTHER PUBLICATIONS

Huang, et al., "Mobile Applications of Focused Link Discovery", Retrieved at <<http://www.cs.otago.ac.nz/homepages/andrew/2011-9.pdf>>, Proceedings of the 16th Australasian Document Computing Symposium, Canberra, Australia, Dec. 2, 2011, pp. 5.

(Continued)

*Primary Examiner* — Maikhanh Nguyen
(74) *Attorney, Agent, or Firm* — Thomas Marquis; Kate Drakos; Micky Minhas

(57) ABSTRACT

The lines in a report are automatically analyzed to determine whether they meet criteria for establishing a link to that line. If so, the link to the identified line is automatically established and placed in the report so that a consumer, by actuating the link, can quickly navigate to the corresponding line.

16 Claims, 12 Drawing Sheets

(56) References Cited

U.S. PATENT DOCUMENTS

| | | | |
|---|---|---|---|
| 7,756,907 B2* | 7/2010 | Stolte | G06F 17/30554 707/805 |
| 7,769,629 B1* | 8/2010 | Kriza | G06Q 30/02 379/265.06 |
| 7,949,500 B2* | 5/2011 | Riggle | G06Q 10/063 345/440 |
| 7,949,937 B2* | 5/2011 | Wu | 715/209 |
| 8,171,418 B2* | 5/2012 | Law | 715/764 |
| 8,190,992 B2* | 5/2012 | Tien et al. | 715/243 |
| 8,204,803 B2* | 6/2012 | Gelerman | G06F 21/6218 705/30 |
| 8,380,742 B2* | 2/2013 | Kiziltunc | G06Q 10/10 707/779 |
| 8,607,138 B2* | 12/2013 | Harold | G06F 17/30554 707/609 |
| 8,751,939 B2* | 6/2014 | Law et al. | 715/744 |
| 2004/0117731 A1* | 6/2004 | Blyashov | G06F 17/211 715/222 |
| 2004/0168115 A1* | 8/2004 | Bauernschmidt | G06F 17/2241 715/238 |
| 2004/0199539 A1* | 10/2004 | Richardson et al. | 707/102 |
| 2005/0262047 A1 | 11/2005 | Wu et al. | |
| 2006/0112070 A1* | 5/2006 | Ramos | 707/102 |
| 2007/0027700 A1* | 2/2007 | Ahamparam | G06Q 10/06311 705/345 |
| 2007/0055688 A1* | 3/2007 | Blattner | 707/102 |
| 2007/0061699 A1* | 3/2007 | Battagin et al. | 715/503 |
| 2007/0130517 A1* | 6/2007 | Wu | 715/530 |
| 2007/0136155 A1* | 6/2007 | Chape et al. | 705/30 |
| 2007/0180471 A1* | 8/2007 | Unz | G06F 17/3089 725/52 |
| 2007/0260625 A1* | 11/2007 | Tien et al. | 707/101 |
| 2007/0294130 A1* | 12/2007 | Riggle | G06Q 10/063 705/7.11 |
| 2008/0066067 A1* | 3/2008 | Stimpson et al. | 718/100 |
| 2010/0049638 A1* | 2/2010 | Gelerman | G06F 21/6218 705/30 |
| 2010/0077343 A1* | 3/2010 | Uhl | G06F 3/04855 715/787 |
| 2011/0209056 A1 | 8/2011 | Choudhary et al. | |
| 2011/0296336 A1 | 12/2011 | Law et al. | |
| 2012/0131444 A1 | 5/2012 | Lin-Hendel | |
| 2013/0111393 A1* | 5/2013 | John | G06F 17/30592 715/781 |
| 2013/0191729 A1* | 7/2013 | Reinbigler | G06F 17/2229 715/243 |

OTHER PUBLICATIONS

"SmartGlance", Retrieved at <<http://smartglance.com/products/product-features.html>>, Retrieved Date: Aug. 24, 2012, pp. 3.

"RelationalCMS", Retrieved at <<http://www.caudillweb.com/en/Tools.aspx>>, Oct. 3, 2010, pp. 3.

"Table of Contents Macro", Retrieved at <<https://confluence.atlassian.com/display/DOC/Table+of+Contents+Macro>>, Retrieved Date: Aug. 24, 2012, pp. 5.

"Comparing Reports", Retrieved at <<http://www.manageengine.com/it360/help/meitms/traffic/help/view-traffic/compare-reports.html>>, Retrieved Date: Aug. 24, 2012, p. 1.

Carter, Jill, "Management Reporter—Advanced Reporting Scenarios and Features", Retrieved at <<http://community.dynamics.com/b/dynamicscpm/archive/2011/08/09/management-reporter-advanced-reporting-scenarios-and-features.aspx>>, Aug. 9, 2011, pp. 5.

International Search Report and Written Opinion for International Application No, PCT/US2013/065153, date of mailing: Jan. 26, 2015, date of filing: Oct. 16, 2013, 9 pages.

* cited by examiner

GP BALANCE SHEET – MANAGEMENT REPORT

File  Edit  Find  Insert  View  Tools  Window  Help

Back  Forward  New Folder  External File  Permissions  Copy Link  Delete  Move  Print  E-mail  Drill Down  Dynamics ACME, Inc.
Summary of All Units
For the One Month Ending Friday, January 31, 2014

| | January | YTD |
|---|---|---|
| Sales | | |
| Sales | | |
| US Sales – Retail/Parts | 1,076,612.82 | 1,076,612.82 |
| Canadian Sales – Retail/Parts | 45,208.55 | 45,208.55 |
| AustralAsian Sales – Retail/Parts | 103,227.22 | 103,227.22 |
| Germany Sales – Retail/Parts | | |
| United Kingdom Sales – Retail/Parts | 7,436.24 | 7,436.24 |
| South Africa Sales – Retail/Parts | 5,034.33 | 5,034.33 |
| Singapore Sales – Retail/Parts | 3,386.64 | 3,386.64 |
| US Sales – Service Plans | 166,894.54 | 166,894.54 |
| Canadian Sales – Service Plans | | |
| AustralAsia Sales – Service Plans | 12,500.00 | 12,500.00 |
| Germany sales – Service Plans | | |
| United Kingdom – Sales – Service Plan... | | |
| US Sales – Installation Charges | 211,747.78 | 211,747.78 |
| Canadian Sales – Installation Charges | | |
| AustralAsian Sales – Installation Charge | 11,154.59 | 11,154.59 |
| Germany Sales – Installation Charges | | |
| United Kingdom Sales – Installation Cha | | |
| South Africa - Installation Charges | | |
| Singapore Sales – Installation Charges | | |
| US Sales – Repair Charges | 82,450.19 | 82,450.19 |
| Canadian Sales – Repair Charges | 4,841.26 | 4,841.26 |
| AustralAsian Sales – Repair Charges | 4,359.40 | 4,359.40 |
| Germany Sales – Repair Charges | | |
| United Kingdom Sales – Repair Charges | | |
| South Africa Sales – Repair Charges | | |
| Singapore Sales – Repair Charges | | |
| US Sales Discount | 2,473.17 | 2,473.17 |

Sales
Total Sales
Cost of Sales
Total Cost of Sales
Gross Profit
Gross Profit %
Expenses
Total Expenses
Net Income 5,215.09   5,215.09

49,193.53   49,193.53

Go To        Page [ 1 ] of 3
GP Bal

Start

FIG. 2C

GP BALANCE SHEET – MANAGEMENT REPORT

File  Edit  Find  Insert  View  Tools  Window  Help

Back  Forward | New  External  Permissions  Copy  Delete  Move    Print    E-mail    Drill    Dynamics
                Folder  File                Link                                    Down

ASSETS — 214

| | | 212 |
|---|---:|---|
| Cash and Short Term Investments | $715,552 | |
| Other Current Assets | | |
| Accounts Receivable | 1,755,240 | |
| Sales Discounts Available | 3,871 | |
| Allowance for Doubtful Accounts | (45,963) | |
| Credit Card Receivable | 22,500 | |
| Interest Receivable | 250 | |
| Notes Receivable | 5,000 | |
| Other Receivables | | |
| Employee Advances | 250 | |
| Inventory – Retail/Parts | 385,087 | |
| WIP – Material | | |
| Applied – Material Fixed OH | | |
| Labor Applied | | |
| Standard Cost Revaluation | | |
| Total Other Current Assets | 2,126,234 | |
| | 2,841,786 | |

216 —

222
ASSET  220
Other Current Assets  218
    Total Other Current Assets
    Total Current Assets
                                            543,696
Fixed Assets                                125,895
Property Plant Equipment                  1,409,884
                                             62,500
    Total Property Plant Equipment           58,975
                                          2,200,951
    Net Fixed Assets
Other Assets                               (927,507)
    Total Other Assets
                                          1,273,444
LIABILITIES AND STOCKHOLDERS' EQUITY
Current Liabilities
    Total Current Liabilities
                                             31,487
Long Term Liabilities                       (27,877)
    Total Long Term Liabilities        224
    Total Liabilities
Stockholders' Equity                          3,610
Total Stockholders' Equity

206 —

Go To ▼  Total Liabilities and Stockholders' Equity        Page [1] of 3

GP Bal [Qu]

Start  [<]  [=|||]

FIG. 2D

DYNAMICALLY CREATED LINKS IN REPORTS

BACKGROUND

There are many different types of reporting systems for generating different types of reports. The reporting systems often include software applications or computer systems that are used for reporting data in different formats. Often, reports are generated in a type of generalized format in an effort to include a variety of different kinds of meaningful information, so that the report is meaningful for a variety of different recipients.

As one specific example, there are many different types of financial reporting systems. Financial reporting systems can be used to generate reports showing financial information for a company. A user normally generates the reports by adding various sections to a hierarchical reporting structure. For instance, a hierarchal financial reporting structure may include categories such as revenue, gross profit, expenses, etc. Within each of those categories, are subcategories, each having a number of different line items. For instance, the revenue section might include different lines each showing revenue attributed to a different revenue source. The expenses section may include line items showing different specific expenses. Of course, the hierarchical structure can be multiple levels deep. As such, many reports can be quite long and cumbersome to review.

It is believed that many who review the reports do not consider all of the information in a given report to be important. Rather, many users only consider a very small number of sections or line items as being important to the user's everyday function. Therefore, those users skip to the sections or line items that they believe are important, and either scan, or do not even review, the remainder of the report. Thus, the report users often need to scroll through an entire report to navigate to a location within the report that shows the data that the user believes to be relevant, so that those lines can be reviewed.

Other users want to review sections of the report in an order that is different from the order the report is presented. Therefore, the users often need to scroll up and down through the report. This is tedious, time consuming and cumbersome.

Some have attempted to address this problem by requiring users to design specialized reports, that is, reports that show only the information that the user believes to be relevant. Others have also attempted to address this problem by requiring the user to intentionally mark the rows of a report that the user believes are important. It can be seen that both of these attempts to address the problem require additional work on the user's part. One requires the user to generate an entirely new (and specific) report, while the other requires the user to go through the report format and identify lines that the user believes are important.

The discussion above is merely provided for general background information and is not intended to be used as an aid in determining the scope of the claimed subject matter.

SUMMARY

The lines in a report are automatically analyzed to determine whether they meet criteria for establishing a link to that line. If so, the link to the identified line is automatically established and placed in the report so that a consumer, by actuating the link, can quickly navigate to the corresponding line.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 2C-2E show embodiments of different user interface displays.

DETAILED DESCRIPTION

Figure 1:
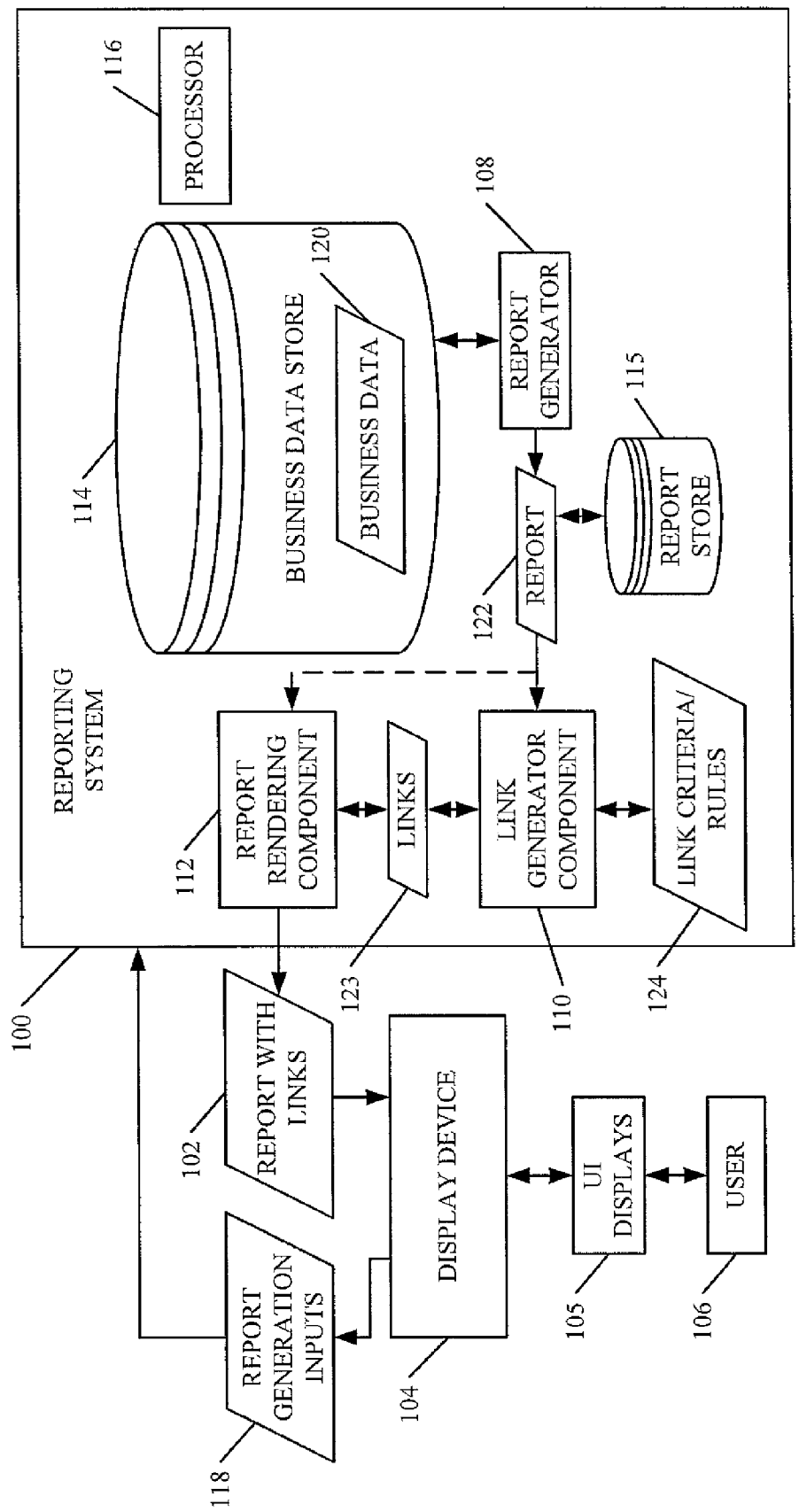
FIG. 1 is a block diagram of one embodiment of a reporting system.

FIG. 1 is a block diagram of one embodiment of a reporting system 100. Reporting system 100 is shown in FIG. 1 providing a report 102, with links, to a display device 104 for display to a user 106. Reporting system 100, itself, illustratively includes report generator 108, link generator component 110, report rendering component 112, business data store 114, report store 115 and processor 116.

User 106 illustratively provides report generation inputs 118 which are used by report generator 108 to generate a report 122 that reports business data 120 stored in data store 114. The underlying report 122 can be generated by a first user and can be stored in report store 115 for later rendering when requested by a second user. The report 122 can be generated by, and rendered for, the same user as well. When report 122 is to be viewed, it is provided to report rendering component 112 and link generator component 110. Link generator component 110 illustratively accesses link criteria (or link rules) 124 and identifies lines in report 122, according to criteria or rules 124, that should have a link thereto in report 102. Link generator component 110 places the links 123 in the report 122 to make the report 102, with the links 123 included, and report 102 is provided to user 106.

In one embodiment, processor 116 is a computer processor with associated memory and timing circuitry (not shown). It is illustratively a functional part of reporting system 110 and is activated by other components or generators or items in system 100 to facilitate their functionality.

Data store 114 and report store 115 are each shown as a single data store within reporting system 100. It will of course be appreciated that data store 114 and report store 115 could be combined or each could be multiple data stores and they can be stored remotely from system 100, or some of them can be located remotely while others are located locally with respect to system 100.

Display device 104 illustratively generates user interface (UI) displays 105 for user 106. UI displays 105 illustratively include user input mechanisms so that user 106 can provide inputs for manipulating and controlling system 100. User 106 can illustratively provide inputs through the user input mechanisms on UI displays 105, or through other input devices. Some user input mechanisms or user input devices can include actuatable links or buttons or other displayed mechanisms on the UI displays which can be actuated by a point and click device (such as a mouse or track ball), hardware or software keyboards or keypads, voice inputs or other mechanisms. In addition, where display device 104 includes a touch sensitive screen, user 106 can provide inputs by touching UI displays 105 with touch gestures, using the user's finger, a stylus, or in other ways.

Figure 2A:
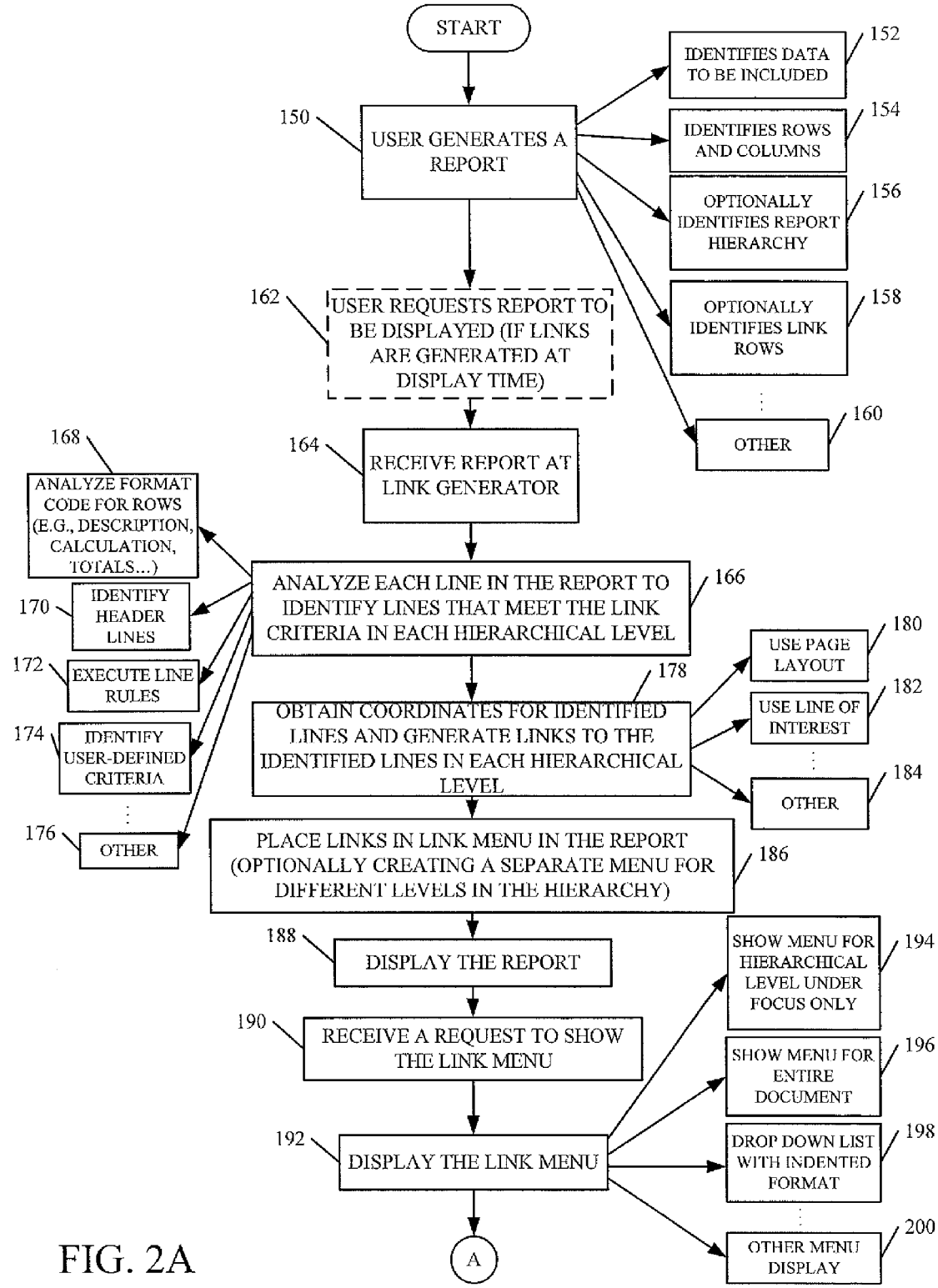
FIGS. 2A and 2B (collectively referred to as FIG. 2) show a flow diagram illustrating one embodiment of the operation of the system shown in FIG. 1.
Figure 2B:
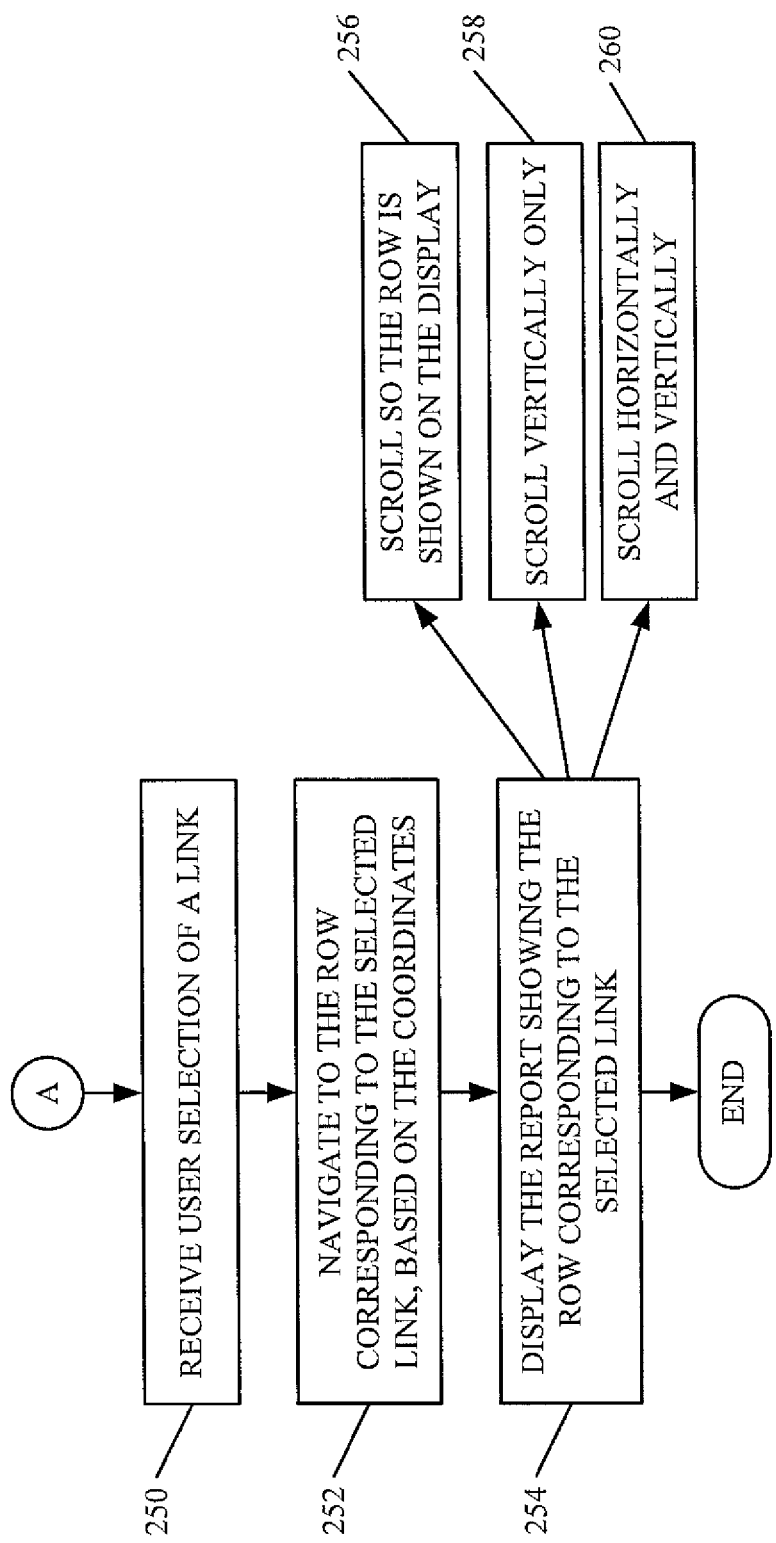

FIGS. 2A and 2B (collectively referred to as FIG. 2) show a flow diagram illustrating one embodiment of the overall operation of system 100 in generating the report 102 with links 123. User 106 illustratively provides inputs to reporting system 100 that cause reporting system 100 (and specifically report generator 108) to generate UI displays 105 that allow user 106 to generate a report 122. This is indicated by block 150 in FIG. 2. In doing so, user 106 will provide report generation inputs 118 that specify certain business data 120 to be included in the report 122, and it can identify sections, rows and columns (or other portions) in the report. It can also optionally identify a report hierarchy, such as which subsections will be included within the individual sections of the report. The hierarchy (e.g., sections, subscribers, etc.) can be predefined or (optionally) defined by the user 106. In one embodiment user 106 can also optionally identify the particular parts of the report that are to have links generated therefor. In one embodiment, user 106 identifies the rows or sections of report 122 that are to have links created therefor by selecting from a dropdown menu, or by inputting them in a text box or otherwise marking them or selecting them from a list. Of course, other ways of identifying report sections or rows that are to have links created therefor can be used as well.

The portions of report 122 that are to have links generated therefore are illustratively automatically identified, as well. Further, the user can identify links while viewing report 122 and all of the links can be stored with report 122 for later use. This is described in greater detail below with respect to block 166. Identifying data to be included in the report is indicated by block 152, identifying rows and columns or other sections is indicated by block 154, optionally identifying the report hierarchy is indicated by block 156, optionally identifying rows or other sections or portions in the report that are to have links generated therefor is indicated by block 158, and providing other report generation inputs 118 is indicated by block 160.

Once the report 122 has been generated, user 106 illustratively provides a user input requesting that report 122 be displayed to user 106 on display device 104. This is indicated by block 162 in FIG. 3. It will be noted that block 162 is provided in phantom to indicate that it is optional. That is, the links 123 that are generated for report 122 can either be generated at report generation time, or on-the-fly when the user requests that report 122 be displayed. Therefore, the discussion below related to generating the links can be done when the report is generated. It is discussed herein in the context of being performed when the report is displayed, but that is optional only.

In any case, the report 122 that is to be displayed is received at link generator component 110. This is indicated by block 164 in FIG. 2. Link generator component 110 analyzes report 122 to identify parts of the report that are to have links 123 generated therefor. It will be noted that link generator component 110 can analyze report 122 in a variety of different ways, such as on row-by-row basis, on a column-by-column basis, on a section-by-section basis, on a subsection-by-subsection basis, etc. and generate links in that way. The discussion below will proceed with respect to link generator component 110 analyzing each row in report 122 to determine whether a link is to be generated for that row. This is described by way of example only.

Link generator component 110 illustratively accesses link criteria or link rules 124 and then analyzes each line in the report to identify lines that meet the link criteria or link rules 124 in each hierarchical level of the report. This is indicated by block 166.

The criteria or rules 124 can take a variety of different forms as well. For instance, some report generation programs have format codes or other design elements that identify the particular rows in a report. By way of example, some format codes identify the rows as being headers, calculations, subtotals, totals, descriptions, etc. Analyzing the format codes is indicated by block 168 in FIG. 2.

Link generator component 110 can analyze the rows based on other criteria as well. For instance, rows that have text but no financial data are normally, in some reporting programs, header lines. Therefore, link generator component 110 can identify the rows that have text but no financial data to identify them has header lines, and to create a link for them as well. This is indicated by block 170 in FIG. 2.

In addition, link generator 110 can execute rules based on the content of the rows. For instance, in one embodiment, link criteria or rules 124 can include formulas for performing calculations based on the financial data entered into the rows. For instance, a rule may indicate that if any amount in any row exceeds a certain predetermined value, then it is to be identified as meeting the link criteria. Of course, the calculations can be more complex as well, such as whether an amount in a given row exceeds an amount in another given row or in a previous column, etc. Still other possible link criteria include text formatting. For instance, links can be created to portions of report 122 that are bold, underlined or italicized, have increased font size or are in certain context (such as a row that follows a blank row). In another embodiment, link generator 110 can identify the links based on the detail levels of a hierarchical structure. For example, a row in the financial detail level can be a link if the corresponding account detail level has a certain set of accounts or a certain number of accounts. A row in an account level can be a link if the corresponding transaction level has more than 100 transactions. These are examples only. Execution of these types of calculations is indicated by block 172 in FIG. 2.

Of course, link generator component 110 can identify the rows that were optionally identified by the user at block 158 in FIG. 2, and these can be determined to meet the link criteria as well. This is indicated by block 174.

It will be noted that link generator component 110 can identify rows as meeting criteria in other ways as well. This is indicated by block 176. Also, in one embodiment, a set of link criteria or rules 124 is displayed to the user of the reporting system, and the user can select which criteria to be used to generate the links. This can be done using a dropdown menu with check boxes, for instance, or in other ways.

In the embodiment discussed herein, for the sake of example, link generator component 110 generates links 123 by analyzing the format code for the rows in report 122. Links are generated for description rows that are not blank or suppressed, as well as calculation rows and total rows. Rows that contain text, but no format code and are not linked to financial dimensions, also meet the link criteria and so a link is created for those rows as well.

Once the lines (or rows) have been identified that are to have links generated therefor, link generator component 110 obtains coordinates for and generates links to the coordinates in each hierarchical level. This is indicated by block 178 in FIG. 2. In one embodiment, in order to get the coordinates for the identified lines, link generator component 110 uses the page layout information to identify a page that the line is on and also uses the location of the line of interest within that page. These are indicated by blocks 180 and 182 in FIG. 2. Using these coordinates, the line of interest can be located accurately within the entire report. Of course, link generator component 110 can identify the coordinates of the line of interest in other ways as well, and this is indicated by block 184.

Link generator component 110 then places the links 123 in menus in report 122. The link menu can illustratively be invoked by a user actuating any desired user input mechanism and this is described in greater detail below.

In accordance with one embodiment, there is a separate link menu that corresponds to each section or subsection of report 122. Therefore, assuming the user is viewing a section in the report, and the user requests the link menu, the link menu will be displayed for that section. Alternatively, of course, the link menu for the entire report can be displayed, with certain portions of the link menu collapsed or expanded, as desired. For instance, in one embodiment, the link menu for the entire report is displayed, but only the link menu for the section that the user is currently viewing is expanded. The user can actuate a user input mechanism to expand or collapse various parts of the link menu to expand or collapse the link menu as well. Again, this is described in greater detail below. Placing the links in a link menu in the report is indicated by block 186 in FIG. 2.

Eventually, report rendering component 112 renders the report 102 with links 123 on display device 104 as a user interface display 105 for user 106. This is indicated by block 188 in FIG. 2. It should also be noted that, once the report is rendered and when the user is viewing the report, the user can be given the capability to create, edit and delete links. This way the links can be created not only during design time or generation time or display time but also at viewing time.

At some point, user 106 will wish to view the link menu to navigate to another section of the report 102 that the user 106 believes to be important. Therefore, the user provides, through a suitable user input mechanism, a request to view the link menu. Report rendering component 102 receives the request to show the link menu. This is indicated by block 190 in FIG. 2.

Report rendering component 112 then displays the link menu as indicated by block 192. In doing so, rendering component 112 can show the link menu for the hierarchical level of the report that is currently under focus. This is indicated by block 194. Of course, the entire link menu for the entire report can be shown as well, and this is indicated by block 196.

The link menu can also be displayed in different formats. For instance, it can be displayed as a single, flat level display, or the elements in the link menu can be displayed according to an indent/out-dent format that corresponds to the hierarchical arrangement of the report. That is, links to subsections can be indented relative to the links to their corresponding parent sections. This is indicated by block 198 in FIG. 2. Other menu displays can be generated as well, and this is indicated by block 200.

Figure 2E:
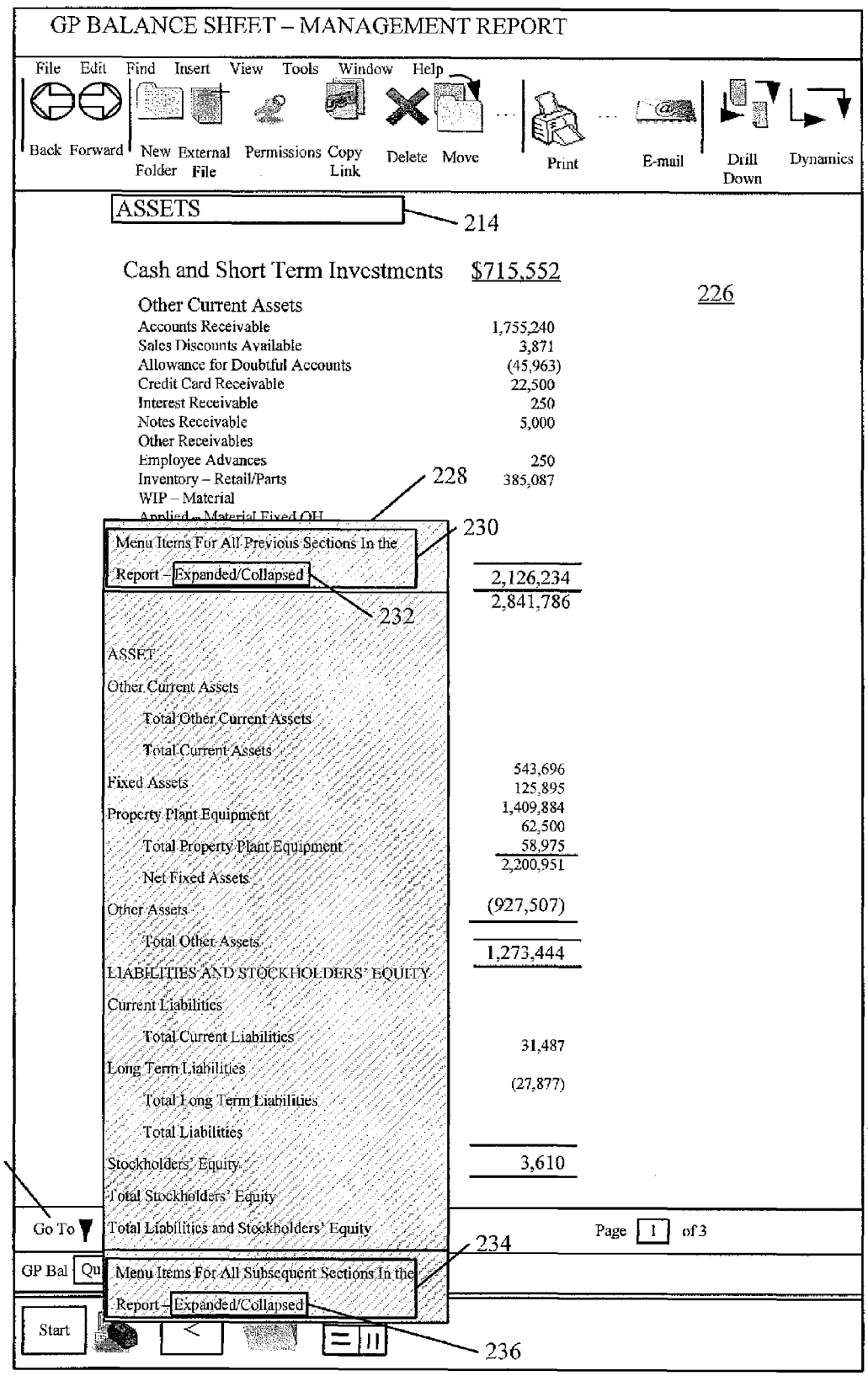

FIGS. 2C, 2D and 2E show exemplary user interface displays that illustrate how the link menu can be displayed. FIG. 2C, for instance, shows user interface display 202. User interface display 202 is showing a financial report with the "sales" section 204 currently under focus. The user 106 then provides an input through a suitable user input mechanism to have the link menu displayed. For instance, when the user actuates the "go to" button 206, link menu 208 pops-up (or drops down) based on that actuation. Link menu 208 shows a list of links for all of the sections that are on the same hierarchical level as sales section 204. Therefore, user 106 can jump to other sections within the financial report by actuating one of the menu items in link menu 208. This will cause report rendering component 112 to navigate the user 106 (e.g., by scrolling the report) to the section corresponding to the actuated menu item (or link). By way of example, if the user actuates the "total cost of sales" link 210, then report rendering component 112 navigates the user to that section of the financial report.

FIG. 2D shows another user interface display 212 showing another embodiment for displaying the link menu. FIG. 2D shows that the user is currently viewing (and has under focus) the assets section 214 of the financial report. When the user actuates a suitable user input mechanism, such as "go to" button 206, this causes link menu 216 to be displayed to the user. Link menu 216 shows a list of links that follow the indent structure corresponding to the hierarchical structure of the financial report being viewed. For instance, it can be seen that the "total other current assets" menu item (or link) 218 is indented with respect to the "other current assets" menu item (or link) 220. This is because the report section corresponding to the link 218 is a subsection of the report section corresponding to link 220. The "assets" link 222 in menu 216 is shown in all capital letters, because it is the parent section of the "other current assets" section corresponding to link 220. Thus, it can be seen in menu 216 that the menu items (or links) are displayed in a way that corresponds to the hierarchical structure of the financial report being viewed. In addition, link menu 216 shows that other sections, at the same level as the assets section, have their links included as well. For instance, the "liabilities and stock holders equity" section has its corresponding link 224 included in the report, and the sections and subsections (the child sections) of that report section have links in menu 216 as well.

FIG. 2E shows yet another user interface display 226 that is similar to user interface display 212, except that the link menu is different. It can be seen that link menu 228 displays links for "asset" section and the immediately following section (the "liabilities and stock holders equity") in expanded form, but it also includes the link menu corresponding to other sections in the financial report (previous and subsequent sections) in collapsed form. For instance, the menu items for all previous sections in the report are shown at 230 and they can either be expanded or collapsed by actuating an appropriate input mechanism, such as mechanism 232. Similarly, menu 228 shows that the link menu items for all subsequent sections in the report are generally indicated by number 234. Those can also be expanded or collapsed by actuating a suitable user input mechanism, such as mechanism 236.

It will be noted, of course, that FIGS. 2C-2E show exemplary user interface displays that can be used to generate a display of the link menu. However, these are exemplary only, and other ways of displaying the link menu can be used as well.

Referring again to FIG. 2, report rendering component 112 illustratively receives a user selection (or actuation) of one of the links in the displayed link menu (e.g., menu 208 or 216). This is indicated by block 250 in FIG. 2. In response, component 112 (or another component) navigates to the row corresponding to the selected (or actuated) link, based upon the coordinates previously identified for the link. This is indicated by block 252 in FIG. 2. Report rendering component 112 then displays the report, showing the row corresponding to the selected link. This is indicated by block 254 in FIG. 2.

This can be done in a number of different ways. For instance, rendering component 112 can display the report with the row or line corresponding to the selected link displayed at the top of the display. This is indicated by block 256 in FIG. 2. Component 112 does this by controlling the scroll function to scroll the report vertically so that the identified row is appropriately located in the desired place atop the user interface display. If the report is only scrolled vertically based on actuation of the link, this is indicated by block 258.

It may also be that a given financial report has too many columns to be displayed on one user interface display screen (either because the number of columns is too large, or because the device displaying the report has relatively limited real estate, such as with a tablet computer, a smart phone, or another mobile device). In that case, report rendering component 112 can also scroll both vertically and horizontally as indicated by block 260. For instance, if the user is viewing a column at the far right hand side of a given row, and the user actuates a link in the link menu to navigate to another line or row in the report, report rendering component 112 can scroll vertically only so that the user stays in the same column, but switches to the row corresponding to the link actuated from the link menu. Alternatively, rendering component 112 can scroll horizontally as well so that the user is not only navigated to the section of the report with the identified row at the top of the view, but the user can be scrolled horizontally to the left most column in that row as well (i.e., to the beginning of the row). In addition, other scrolling options or techniques can also be used.

Further, while the above discussion has proceeded with respect to creating links to rows, links can also be created for columns as well. For instance, assume a report 122 has columns that indicate different months of a year. Links can be generated for specific months, such as "Sales: December." These types of links can be displayed in a hierarchical link display menu.

It should also be noted that, because there are links to different portions of report 122, those portions can be individually addressable. For instance, assume report 122 has links A, B, and C. In that case, the URL "http://reportserver/report122" can retrieve the entire port 122. However, the URL "http://reportserver/report122#B" can retrieve just the contents of report 122 between links B and C. Other ways of using the links to address individual portions of the report 122 can also be used.

It can thus be seen that system 100 dynamically creates links to areas or portions of a report either when the report is generated or when it is to be viewed. The user need not specifically determine which parts of the report are to have links, but the links can be derived entirely automatically.

The scrolling can also take into account whether a cell was active when the user actuated the link in the link menu. For instance, if the user was viewing the report and had activated a cell in a column, and the user then actuated one of the links in the link menu, report rendering component 112 can navigate the user to the row corresponding to the link in the link menu, and also scroll to the column that the user was previously looking at, and make the intersection of that column and the row corresponding to the link in the link menu the active cell. This is exemplary only and other scrolling techniques can be used.

In addition, certain rows or portions of rows can be highlighted as well. This is by way of example only.

Also, in one embodiment, the link menu can be activated for only certain portions of the report. For instance, the link menu may be activated for a financial part of the report, but not for an account and traction level of the report.

Figure 3:
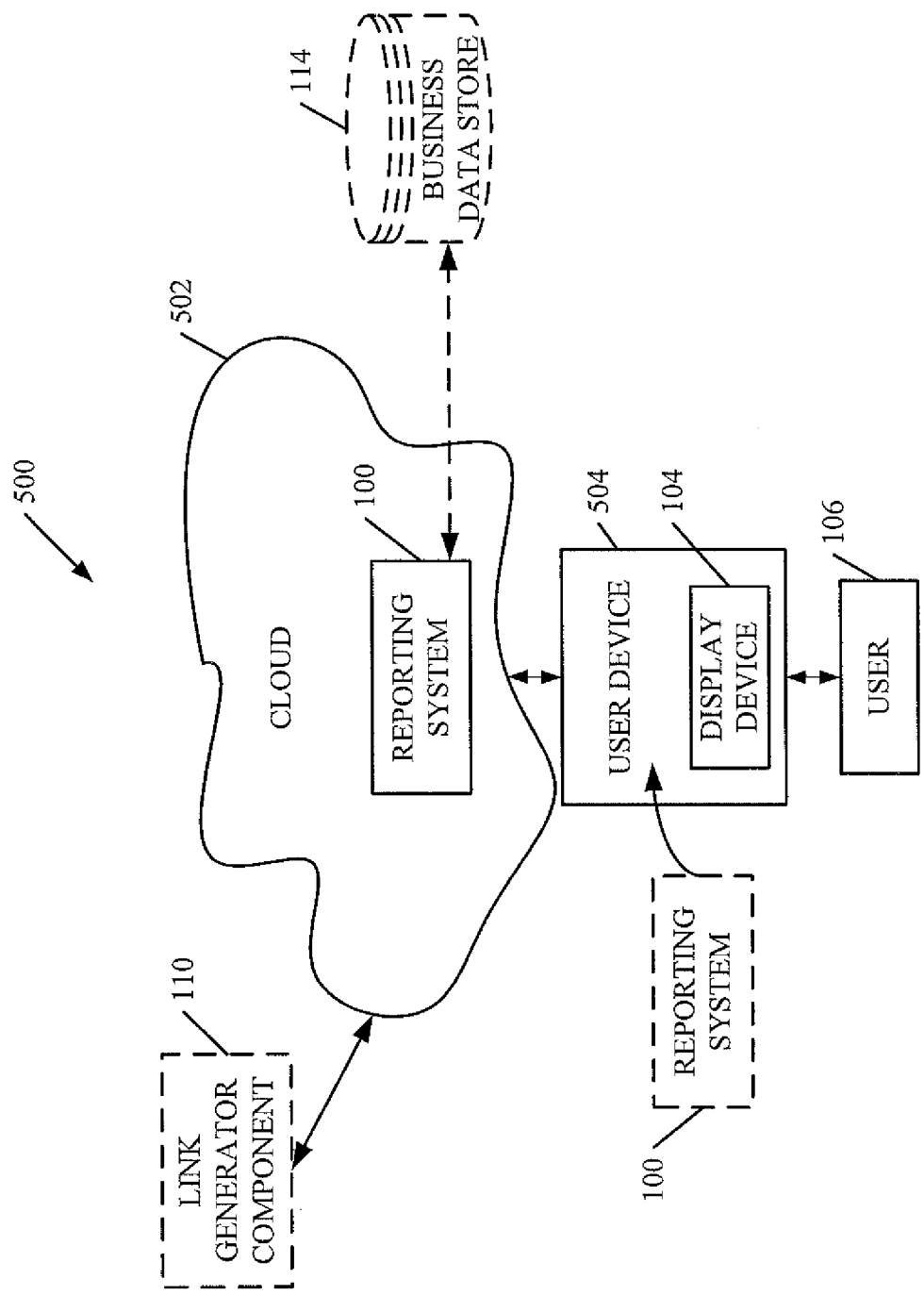
FIG. 3 shows the reporting system of FIG. 1 in various architectures.

FIG. 3 is a block diagram of system 100, shown in FIG. 1, except that it is disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of system 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 3, some items are similar to those shown in FIG. 1 and they are similarly numbered. FIG. 3 specifically shows that business system 100 is located in cloud 502 (which can be public, private, or a combination where portions are public while others are private). Therefore, user 106 uses a user device 504 to access those systems through cloud 502.

FIG. 3 also depicts another embodiment of a cloud architecture. FIG. 3 shows that it is also contemplated that some elements of business system 100 are disposed in cloud 502 while others are not. By way of example, data store 114 can be disposed outside of cloud 502, and accessed through cloud 502. In another embodiment, link generator component 110 is also outside of cloud 502. Regardless of where they are located, they can be accessed directly by device 504, through a network (either a wide area network or a local area network), they can be hosted at a remote site by a service, or they can be provided as a service through a cloud or accessed by a connection service that resides in the cloud. FIG. 3 also shows that system 100, or portions of it, can reside on user device 504 as well. All of these architectures are contemplated herein.

It will also be noted that system 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 4:
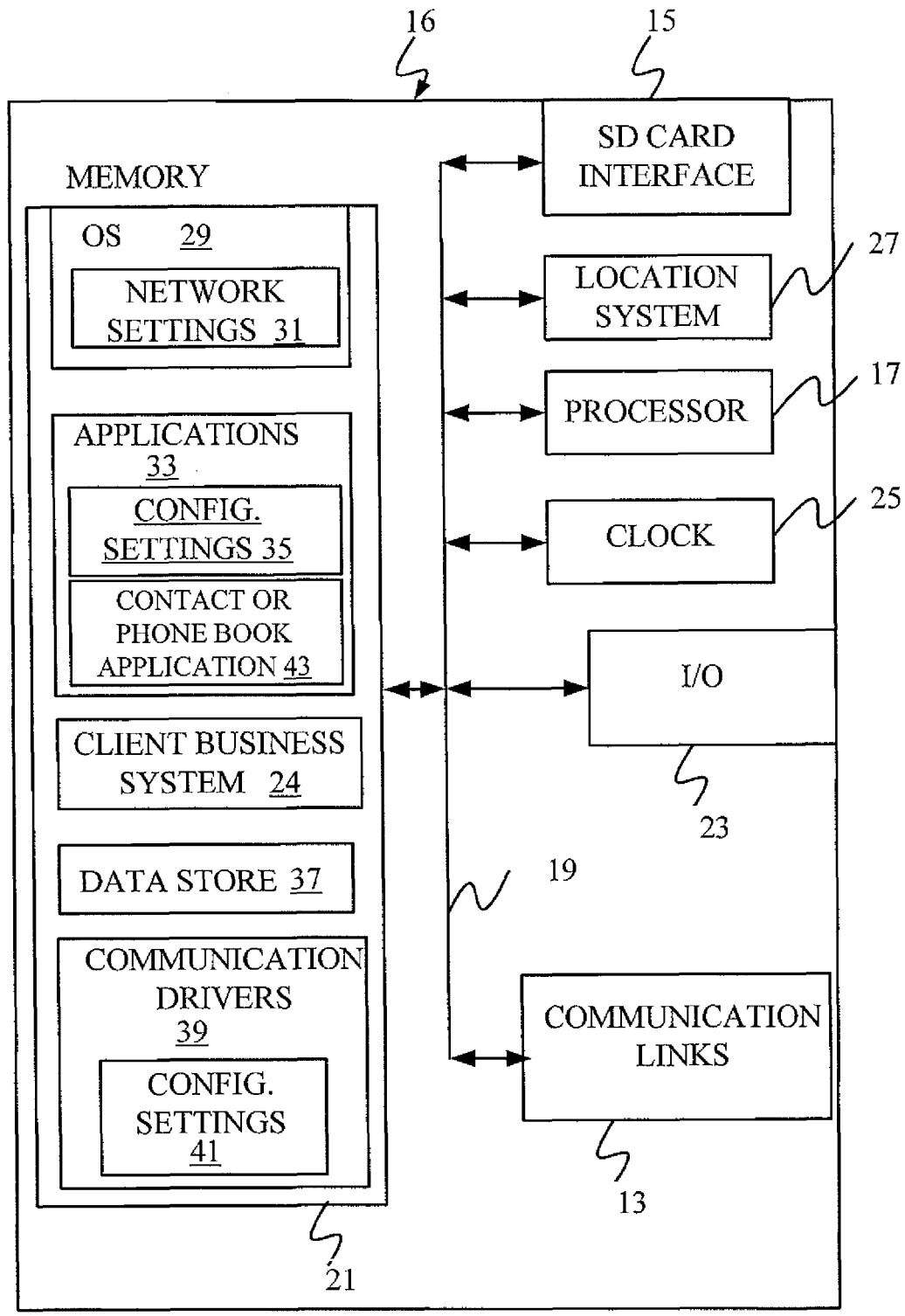
FIGS. 4-7 show various embodiments of mobile devices.
Figure 5:
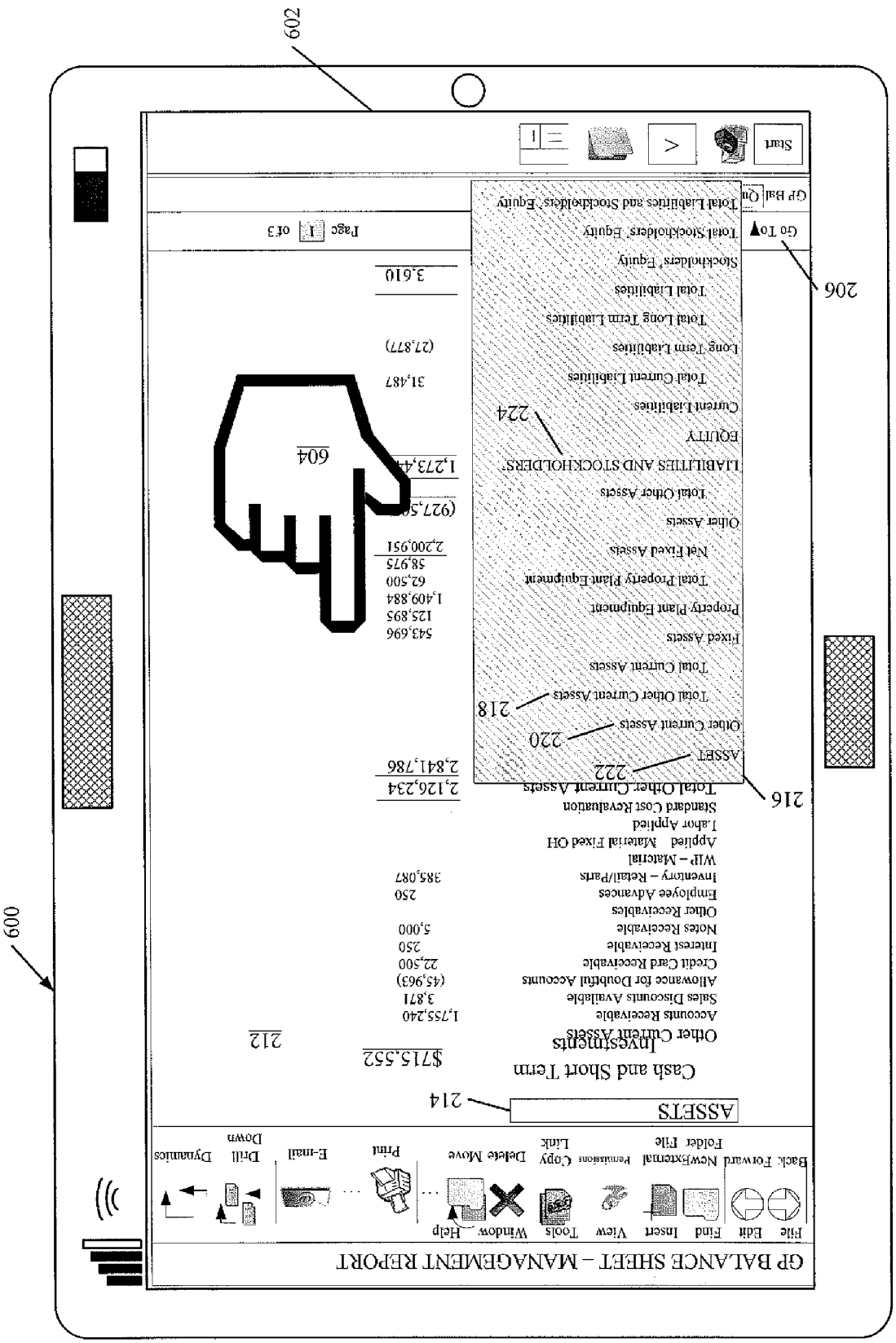
Figure 6:
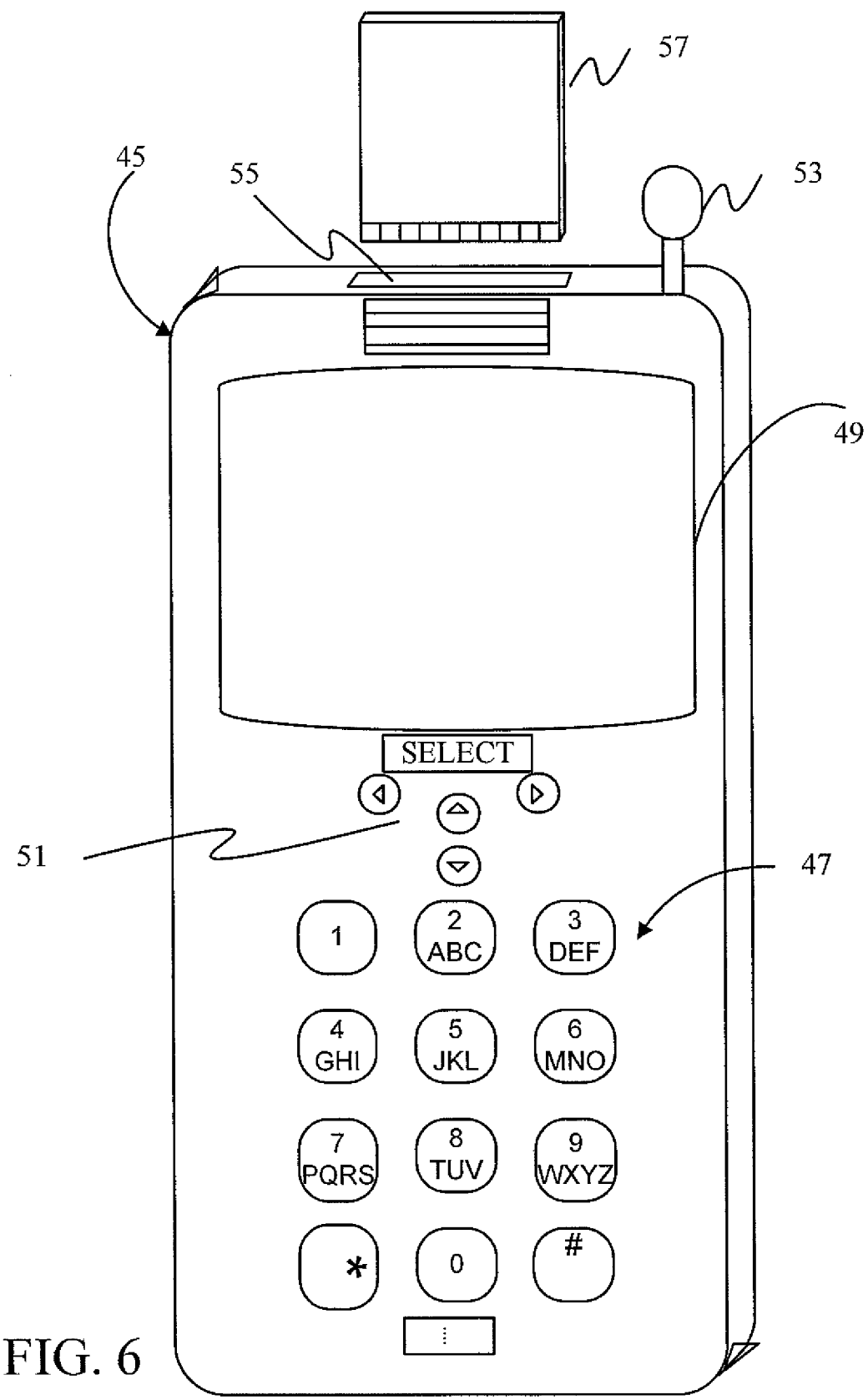
Figure 7:
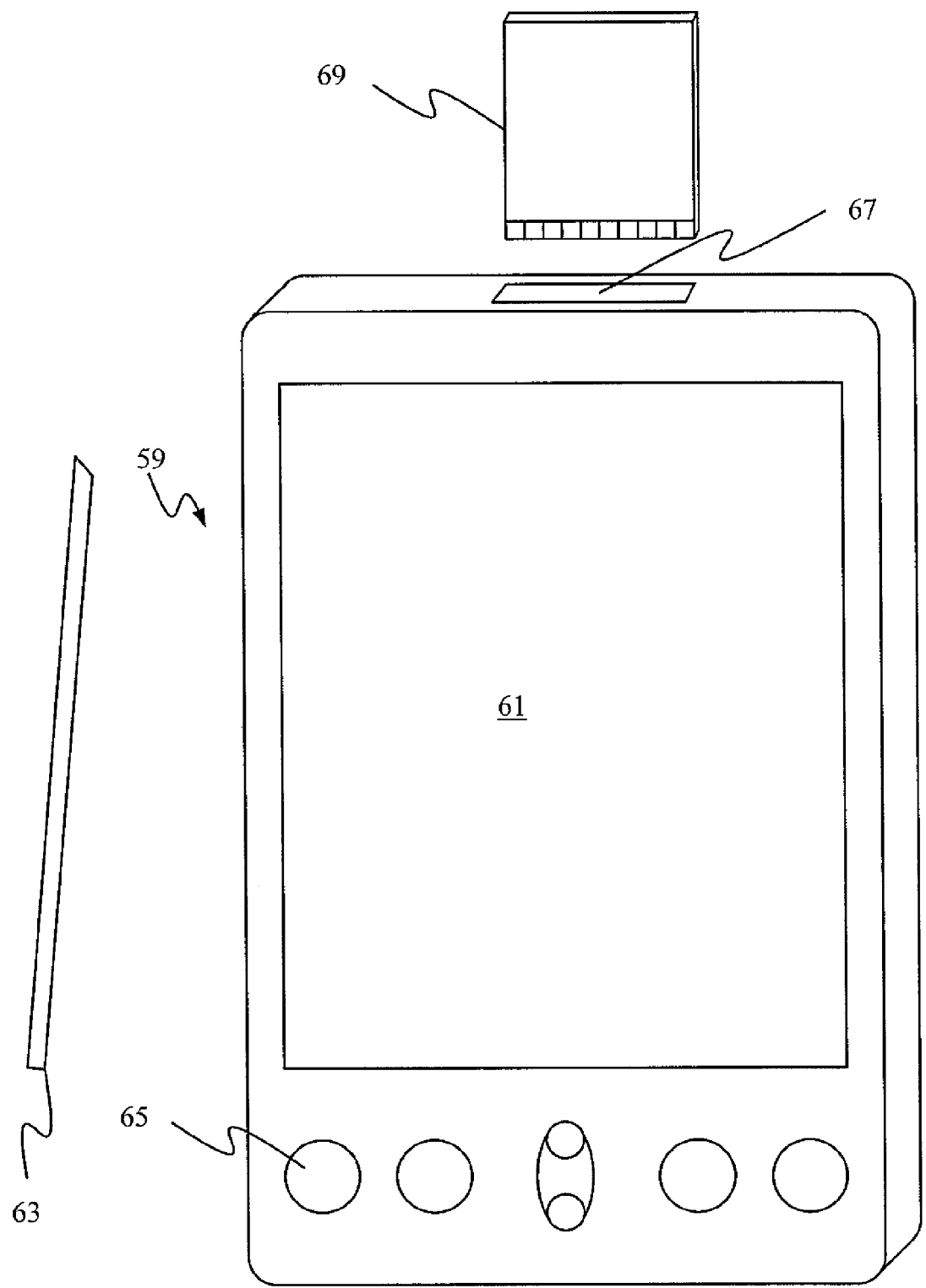

FIG. 4 is a simplified block diagram of one illustrative embodiment of a handheld or mobile computing device that can be used as a user's or client's hand held device 16, in which the present system (or parts of it) can be deployed. FIGS. 5-7 are examples of handheld or mobile devices.

FIG. 4 provides a general block diagram of the components of a client device 16 that can run components of system 100 or that interacts with system 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems (like system 100) are received on a removable Secure Digital (SD) card that is connected to a SD card interface 15. SD card interface 15 and communication links 13 communicate with a processor 17 (which can also embody processor 116 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. System 100 or the items in data store 114, for example, can reside in memory 21. Similarly, device 16 can have a client business system 24 which can run various business applications or embody parts or all of system 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 5 shows one embodiment in which device 16 is a tablet computer 600. In FIG. 5, computer 600 is shown with user interface display 212 (shown in FIG. 2D) displayed on the display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIGS. 6 and 7 provide additional examples of devices 16 that can be used, although others can be used as well. In FIG. 6, a smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 7 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Note that other forms of the devices 16 are possible.

Figure 8:
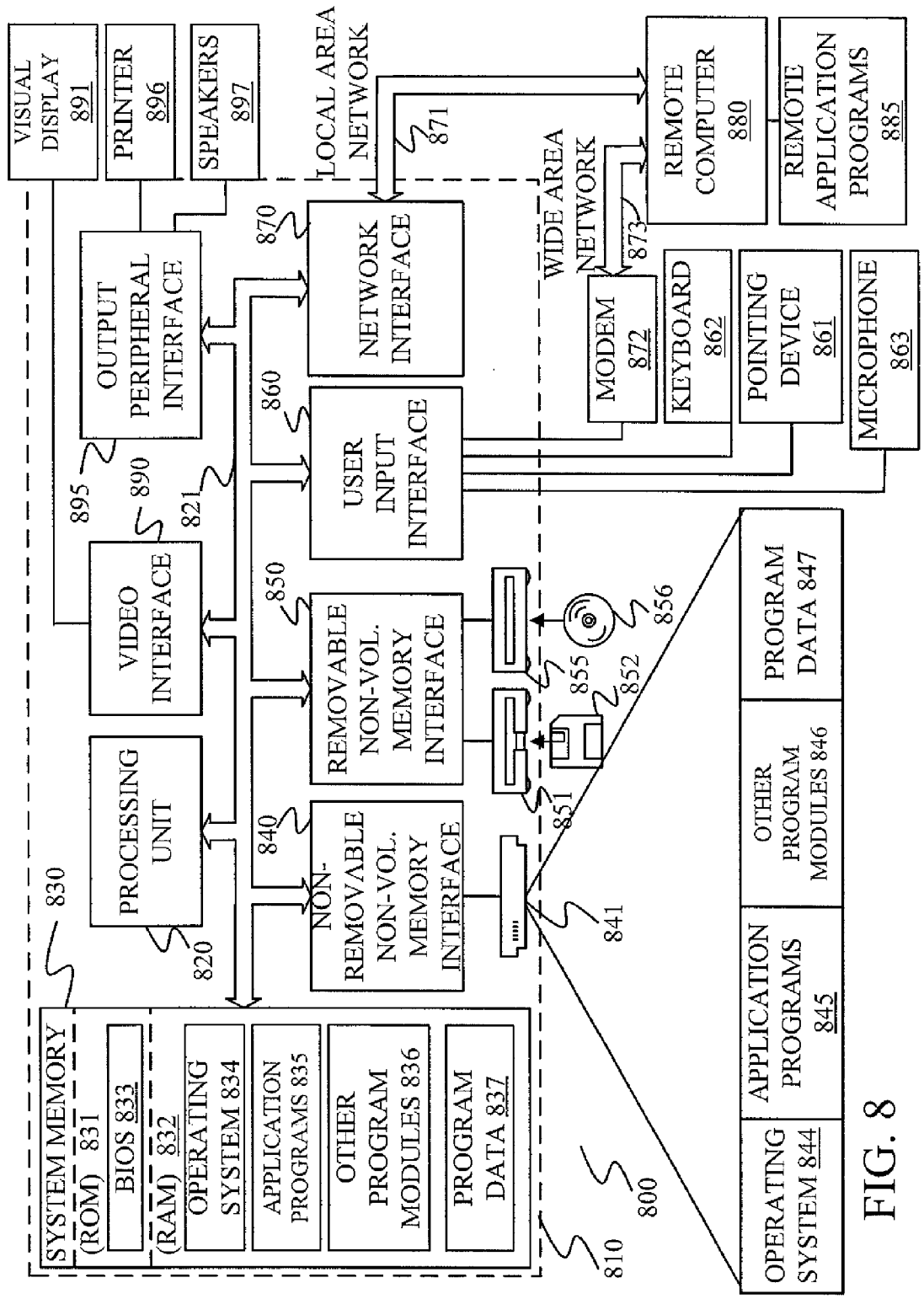
FIG. 8 is a block diagram of one illustrative computing environment.

FIG. 8 is one embodiment of a computing environment in which system 100 (for example) can be deployed. With reference to FIG. 8, an exemplary system for implementing some embodiments includes a general-purpose computing device in the form of a computer 810. Components of computer 810 may include, but are not limited to, a processing unit 820 (which can comprise processor 116), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 8 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
    identifying a report based on an indication of a user report identifier input, the report having sections arranged in a hierarchical structure and including report data identified from a data source based on a report generation criterion;
    defining a plurality of links by applying a link criterion to the report data based on an indication of a user link request, each link corresponding to a portion of the report identified based on applying the link criterion;
    generating a representation of a report user interface display that includes the report data and a link menu that includes the plurality of links, wherein each link in the link menu is actuatable to navigate the report user interface display to the corresponding portion of the report and includes a description indicative of the report data in the corresponding portion of the report, the links being indented or out-dented on the link menu relative to one another according to an indent structure indicative of the hierarchical structure of sections;
    identifying a particular one of the links based on an indication of user actuation of the particular link; and
    generating the representation of the report user interface display to represent navigation of the report user interface display to the portion of the report corresponding to the particular link.

2. The computer-implemented method of claim 1, wherein the plurality of links are displayed as a list on the link menu, each link corresponding to a different portion of the report.

3. The computer-implemented method of claim 2 wherein the report has a plurality of different sections, and the method further comprises:
    identifying a particular one of the sections under focus in the report user interface display; and
    selecting the plurality of links to display on the link menu based on the identification of the particular section under focus, such that the list only includes links in the section under focus.

4. The computer-implemented method of claim 2 wherein the report has a plurality of different sections, and wherein the list on the link menu includes links corresponding to all sections of the report.

5. The computer-implemented method of claim 4 wherein the report user interface display includes a collapse user input mechanism that is actuated to collapse and expand the links corresponding to different sections of the report.

6. The computer-implemented method of claim 1 wherein the report comprises a plurality of different rows and a plurality of different columns defining a plurality of cells, the link corresponding to a particular one of the rows, and wherein generating the representation of the report user interface display to represent navigation of the report user interface display comprises:
    scrolling the report so the particular row is displayed as a top row.

7. The computer-implemented method of claim 6 wherein the indication of user actuation of the particular link is received when a particular one of the columns is displayed, and wherein generating the representation of the report user interface display to represent navigation of the report user interface display comprises:
    scrolling the report horizontally to display the particular column.

8. The computer-implemented method of claim 7 wherein the indication of user actuation of the particular link is received when a particular one of the cells is active, and wherein navigating the report user interface display comprises:
    activating a cell in the particular row in the particular column.

9. The computer-implemented method of claim 1 wherein identifying the report comprises:
    identifying the report based on receiving an indication of user actuation of a link request user input mechanism on the report user interface display.

10. The computer-implemented method of claim 1 and further comprising:
    receiving the report to be displayed;
    accessing the link criterion;
    automatically identifying the portions of the report for which links are to be generated, based on the link criterion; and
    generating links to the identified portions of the report.

11. The computer-implemented method of claim 10 wherein the report comprises a plurality of different rows and wherein automatically identifying the portions of the report comprises:
    determining whether format codes in each row match the link criterion.

12. The computer-implemented method of claim 10 wherein the report comprises a plurality of different rows and wherein automatically identifying the portions of the report comprises:
    determining whether content in each row matches the link criterion.

13. The computer-implemented method of claim 10 wherein the report comprises a plurality of different rows, wherein at least some rows have amounts entered therein, and wherein automatically identifying the portions of the report comprises:
    determining whether the amounts match the link criterion.

14. The computer-implemented method of claim 13 and wherein automatically identifying the portions of the report comprises:
    performing a calculation using the amounts to obtain a calculation result; and
    determining whether the calculation result matches the link criterion.

15. A computing system, comprising:
    a processor; and
    memory storing instructions executable by the processor, wherein the instructions configure the computing system to:
    identify a report comprising report data identified from a data source based on a report generation criterion;
    identify a hierarchical structure of the report;
    access a link criterion;
    automatically generate a plurality of links by applying the link criterion to the report data, each link corresponding to a portion of the report identified based on applying the link criterion;

generate a representation of a report user interface display that displays the report data and the plurality of links in a structure that is indicative of the identified hierarchical structure of the report, wherein each link is actuatable to navigate the report user interface display to the corresponding portion of the report;

receive an indication of user actuation of a particular one of the links; and update the representation of the report user interface display to scroll the report vertically and horizontally to display the portion of the report corresponding to the particular link.

16. A computing system comprising:

a processor; and memory storing instructions executable by the processor, wherein the instructions configure the computing system to:

identify a report to be displayed based on an indication of a report identifier user input;

generate the report, the report having sections arranged in a hierarchical structure and including report data identified from a data source based on a report generation criterion;

based on an indication of a user link request, generate a set of actuatable links as a list on a menu, each link being generated by applying a link criterion to the report data, each link corresponding to a portion of the report and being actuatable to navigate to the portion of the report, the links being indented or out-dented on the list relative to one another according to an indent structure indicative of the hierarchical structure of sections; and generate a representation of a report user interface display that displays the report and the menu;

identify a particular one of the links based on an indication of user actuation of the particular link;

navigate the report user interface display to display the portion of the report corresponding to the particular link.

\* \* \* \* \*